US010738505B2

(12) United States Patent
Lang

(10) Patent No.: US 10,738,505 B2
(45) Date of Patent: Aug. 11, 2020

(54) DOOR LOCK WITH DOOR SWITCH

(71) Applicant: emz-Hanauer GmbH & Co. KGaA, Nabburg (DE)

(72) Inventor: Markus Lang, Neunburg vorm Wald (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 920 days.

(21) Appl. No.: 15/258,362

(22) Filed: Sep. 7, 2016

(65) Prior Publication Data

US 2017/0067270 A1 Mar. 9, 2017

(30) Foreign Application Priority Data

Sep. 9, 2015 (DE) .................. 10 2015 011 809

(51) Int. Cl.
*A47J 27/08* (2006.01)
*A47L 15/42* (2006.01)
(Continued)

(52) U.S. Cl.
CPC ....... *E05B 47/0002* (2013.01); *A47J 27/0804* (2013.01); *A47L 15/4259* (2013.01); *D06F 37/28* (2013.01); *D06F 39/14* (2013.01); *E05B 17/005* (2013.01); *E05B 17/2007* (2013.01); *E05B 17/22* (2013.01); *E05B 65/00* (2013.01); *D06F 37/42* (2013.01); *E05B 2047/0068* (2013.01)

(58) Field of Classification Search
CPC ...... E05B 47/0002; E05B 65/00; E05B 17/22; E05B 17/2007; E05B 17/005; E05B 2047/0068; D06F 39/14; D06F 37/28; D06F 37/42; A47L 15/4259; A47J 27/0804; H01H 9/22; H01H 3/161
See application file for complete search history.

(56) References Cited

U.S. PATENT DOCUMENTS 9,107,560 B2 * 8/2015 Bauriedl ............. A47L 15/4259

FOREIGN PATENT DOCUMENTS

DE 198 37 248 A1 2/2000
DE 102006058322 A1 6/2008
(Continued)

*Primary Examiner* — Kristina R Fulton
*Assistant Examiner* — Thomas L Neubauer
(74) *Attorney, Agent, or Firm* — Robert R. Deleault, Esq.; Mesmer & Deleault, PLLC

(57) ABSTRACT

A door lock for a household electrical appliance has an electric door switch with two contact elements, a pusher and a pusher control element. The pusher presses against a first contact element that holds the door switch in one of the two switching states. When the pusher is displaced from a first pusher position to a second pusher position, the door switch transfers into the other of the two switching states. The pusher control element, which is movable relative to the pusher, moves from one of the two control positions to the other on closing of the door. The pusher control element has a control path where a first path section blocks the pusher against displacement from the first pusher position to the second pusher position and a second path section provides the pusher with space for a displacement from the first pusher position to the second pusher position.

23 Claims, 5 Drawing Sheets

(51) Int. Cl.
*D06F 37/28* (2006.01)
*E05B 47/00* (2006.01)
*D06F 39/14* (2006.01)
*E05B 17/00* (2006.01)
*E05B 17/20* (2006.01)
*E05B 17/22* (2006.01)
*E05B 65/00* (2006.01)
*D06F 37/42* (2006.01)

(56) References Cited

FOREIGN PATENT DOCUMENTS

| | | |
|---|---|---|
| DE | 10 2010 051 518 A1 | 5/2012 |
| WO | 2006/063684 A1 | 6/2006 |
| WO | 2013/150410 A1 | 10/2013 |

* cited by examiner

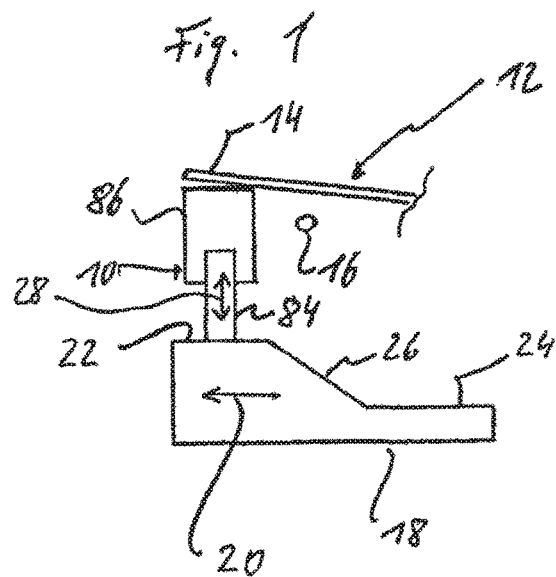
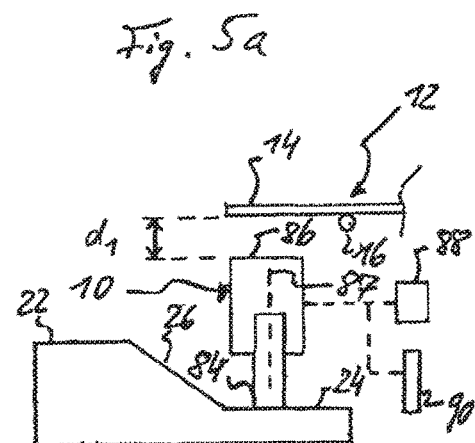
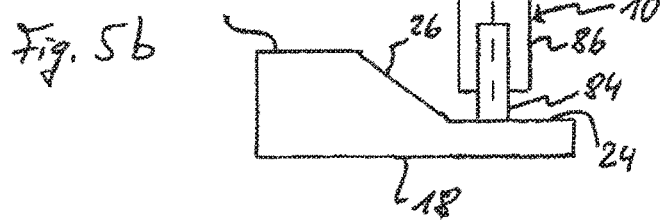
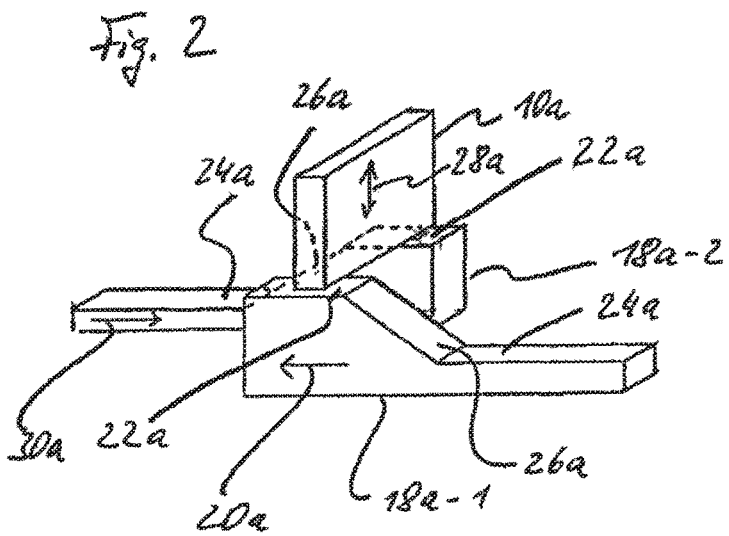

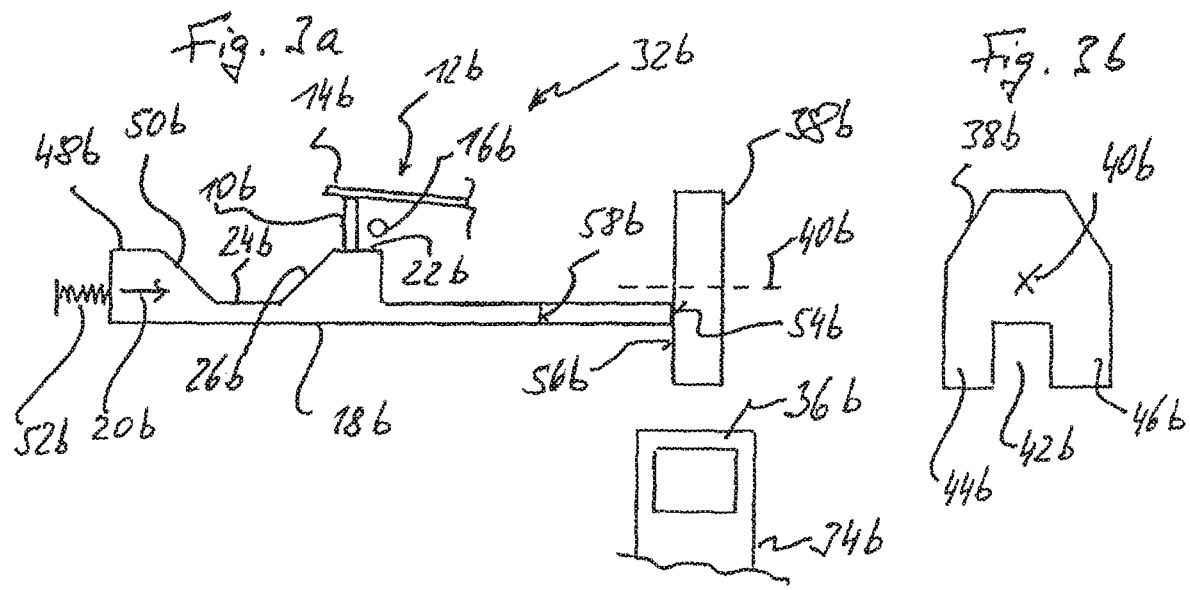
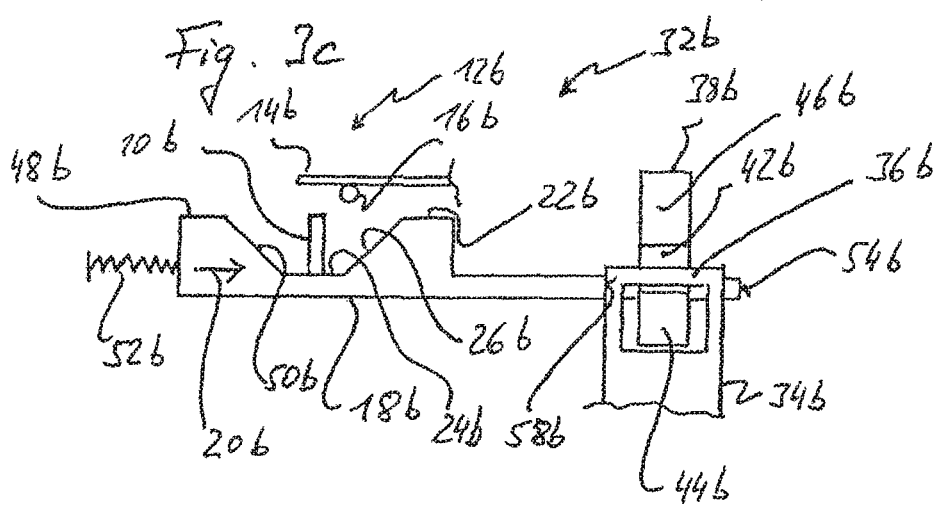
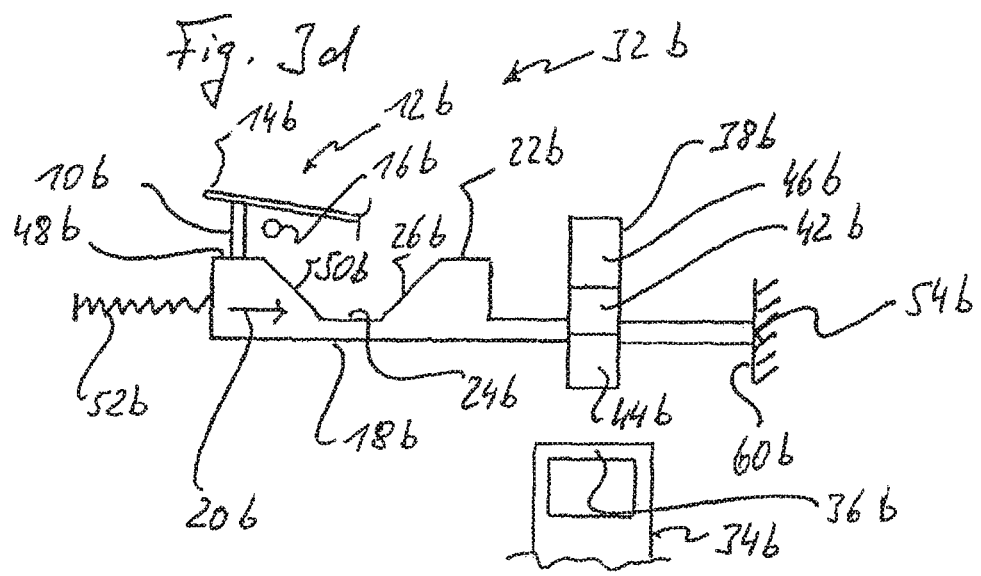

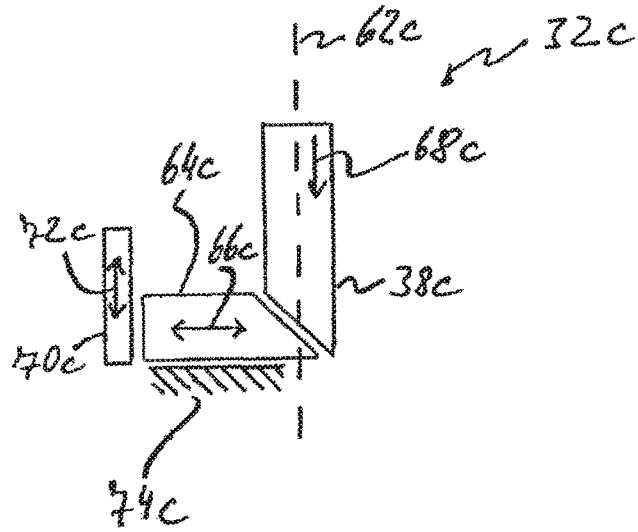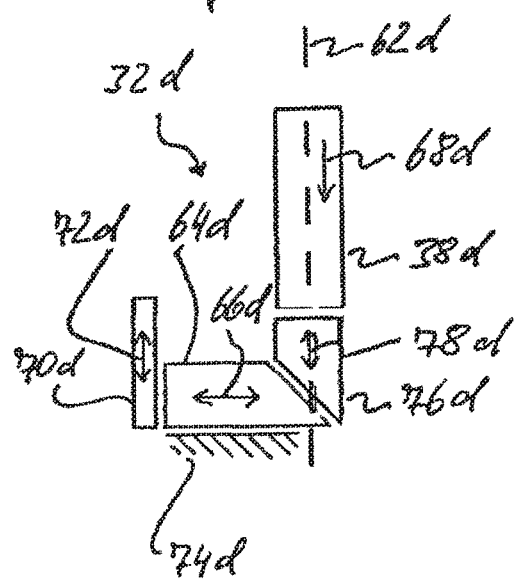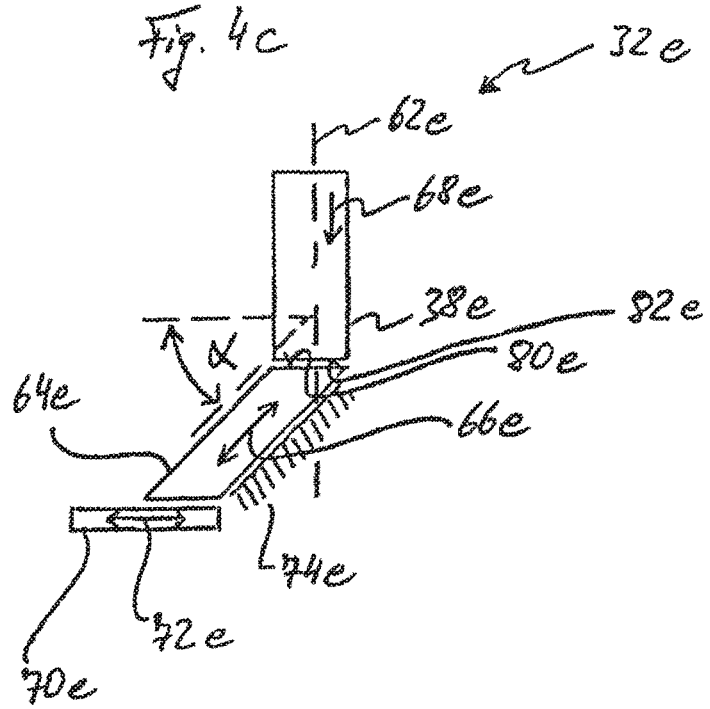

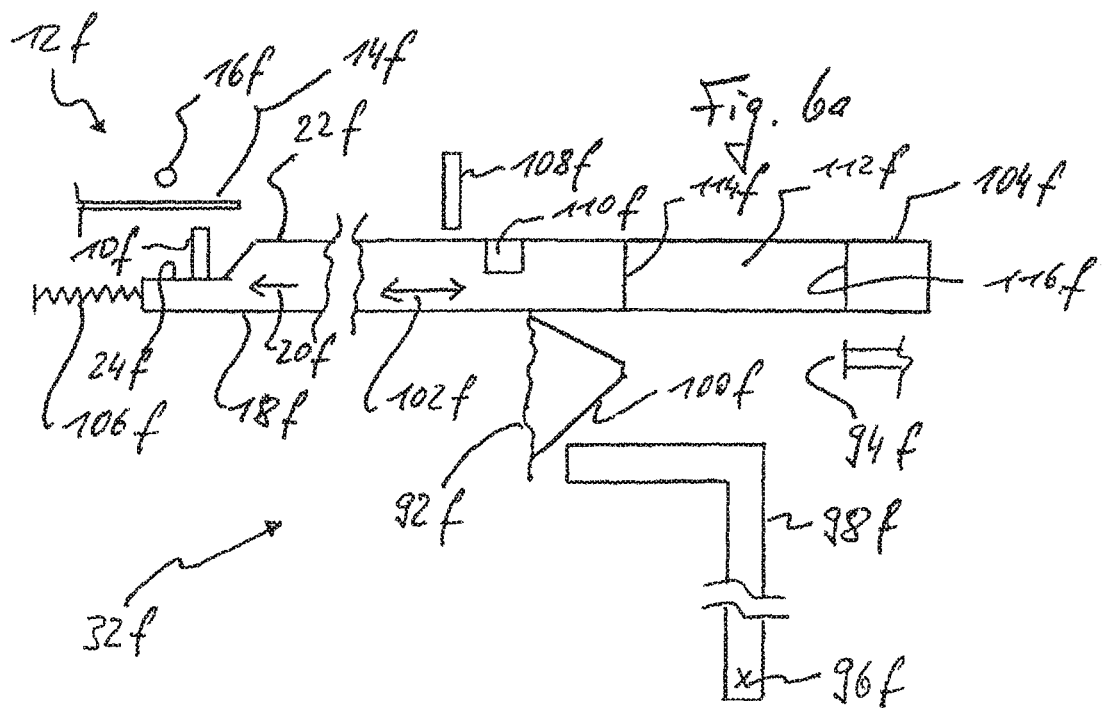
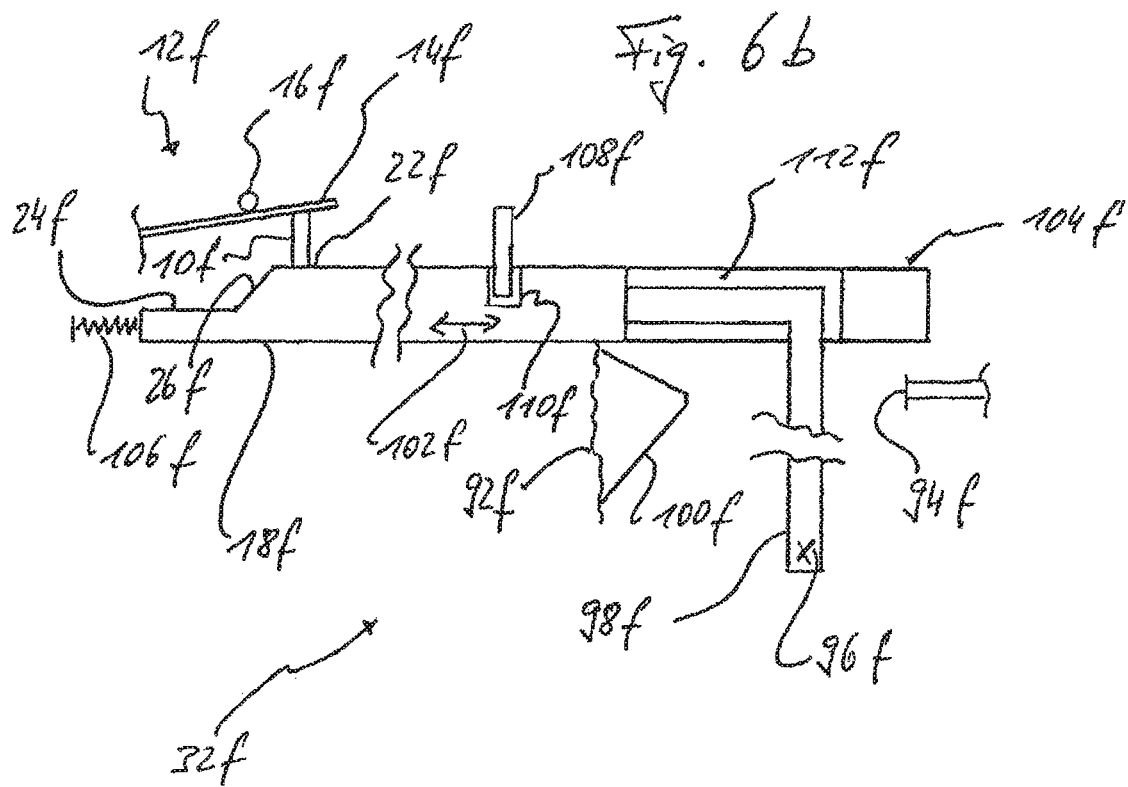

DOOR LOCK WITH DOOR SWITCH

BACKGROUND OF THE INVENTION

1. Field of the Invention

The present invention relates generally to a door lock for a household electrical appliance.

2. Description of the Prior Art

In modern households, there are various household electrical appliances that have a door lock to keep a door of the household appliance closed. Examples of such household electrical appliances are a washing machine, a washer dryer, a dishwasher and an electric cooker. Occasionally the door lock contains an electric door switch to be able to distinguish the state of the open door from the state of the closed door. Depending on the detection of the closed door state, a follow-up function can be activated in the household appliance. For example, an operating run of the household appliance can be started and/or a locking mechanism can be activated, which locks the door in its closed position, so that it cannot be opened. For their execution such follow-up functions require that the door was closed first. A door switch, which upon closing of the door is transferred from a first switching state to a second switching state, is a suitable means for detecting the closing of the door.

SUMMARY OF THE INVENTION

The invention provides a new type of construction for operating a door switch when closing the door of a household electrical appliance. To this end the invention provides a door lock for a household electrical appliance that includes an electric door switch including two contact elements that is transferred from a first switching state to a second switching state upon closing of a door of the household appliance; a pusher, which is displaceable in a first movement direction from a first pusher position to a second pusher position, where the pusher presses against a first of the contact elements in the first pusher position and by this holds the door switch in one of the two switching states, where by displacing the pusher from the first pusher position into the second pusher position, a transfer of the door switch can be brought about to the other of the two switching states; and at least one pusher control element, which is movable relative to the pusher in a second movement direction running transversely, preferably perpendicularly, to the first movement direction at least between a first control position and a second control position and which moves upon closing of the door from one of the two control positions to the other, where the pusher control element includes a control path having a plurality of path sections following one another along the second movement direction, where the plurality of path sections comprises a first path section, which in the first control position blocks the pusher against displacement into the second pusher position, and where the plurality of path sections further comprises a second path section, which in the second control position provides the pusher with space for a displacement into the second pusher position.

In certain embodiments, the first switching state of the door switch is an open switching state, while the second switching state is a closed switching state. A configuration of this kind is advantageous, for example, if the door switch is integrated into an electric circuit, in which an electric current is supposed to flow via the door switch when the door is closed, for instance to energize an electric actuator of a locking mechanism of the door lock. It is not excluded in the scope of the invention, however, that the first switching state of the door switch is a closed switching state and the second switching state is an open switching state.

In certain embodiments, the two contact elements are pre-loaded by spring force in reciprocal contact, wherein the pusher in its first pusher position lifts one of the contact elements out of contact with the other contact element. In other embodiments, the pusher presses one of the contact elements into contact with the other contact element in its first pusher position.

One of the contact elements can be formed by a leaf spring, for example, while the other of the contact elements can be formed by a pin, for example. The pin is arranged fixedly in certain embodiments.

In certain embodiments, the control path runs between consecutive path sections in the form of a ramp obliquely to a plane orthogonal to the first movement direction. A ramp section between the first path section and the second path section in certain embodiments can be used to lift the pusher from the second path section onto the first path section.

In certain embodiments, the door lock comprises a locking mechanism that is adjustable between an unlocked state and a locked state, and in the unlocked state permits opening of the closed door and in the locked state locks the closed door against opening, where an effective length of the pusher measured along the first movement direction is variable as a function of a transfer of the locking mechanism from the unlocked state to the locked state.

To vary the effective length of the pusher, in certain embodiments the pusher has a base part for engaging with the pusher control element as well as a pusher part that sits on the base part and is movable relative to this in the first movement direction between a raised and a lowered position for engagement with the first of the contact elements, where upon transfer of the locking mechanism from the unlocked state to the locked state, the pusher part moves from the raised position to the lowered position or vice versa.

To transfer the pusher part between the raised and the lowered position, it is provided in certain embodiments that the pusher part is arranged rotatably, relative to the base part, about a first axis of rotation running in the first movement direction, and between the pusher part and the base part at least one run-up surface is effective running ramp-like obliquely to a plane that is orthogonal to the first movement direction.

The locking mechanism can comprise an electromagnetic actuator, which is in actuation engagement with the pusher, in order to adjust the pusher part between a greater and a smaller effective length.

In a configuration in which the door switch has two contact elements pre-loaded by spring force in reciprocal contact and in its first pusher position the pusher lifts one of the contact elements out of contact with the other contact element, closing of the door can lead to the pusher losing contact with the one of the contact elements and a gap arising between the pusher and the one of the contact elements. To guarantee increased security against undesirable switching processes of the door switch, it is provided in certain embodiments that upon transfer of the locking mechanism from the unlocked state to the locked state, a clear distance between the pusher and the one of the contact elements is increased. The increased distance between the pusher and the one of the contact elements can guarantee that in the locked state, any movements of the pusher that can issue from an attempt to open the locked door forcibly, for example, do not lead unintentionally to a change in the switching state of the door switch.

In certain embodiments the pusher control element is located in the first control position when the door is open. In these embodiments, the pusher is accordingly blocked against displacement to the second pusher position when the door is open. In other embodiments the pusher control element is located in the second position when the door is open. The pusher is located accordingly in the second pusher position when the door is open.

In certain embodiments, the at least one pusher control element comprises in total a single pusher control element. In other embodiments, on the other hand, the at least one pusher control element comprises two pusher control elements that are movable independently of one another and are both located in the same control position when the door is open.

In certain embodiments, the door lock comprises a lock housing as well as a gripper unit taken up in the lock housing rotatably about a second axis of rotation, which unit rotates upon closing of the door of the household appliance from an open turning position into a closed turning position, wherein in the closed turning position the gripper unit grips a locking clip for holding the door closed and in the open turning position releases the locking clip for opening the door. The at least one pusher control element in such embodiments comprises a first pusher control element, which is supported in the open turning position of the gripper unit with spring pre-loading on the gripper unit, and when the gripper unit is rotated from the open turning position to the closed turning position executes a movement from the one to the other control position under the effect of the spring pre-loading.

The first pusher control element can be able to be pushed back by engagement with the gripper unit into the one from the other of the two control positions against the effect of the spring pre-loading.

In certain embodiments, the first pusher control element is supported on the locking clip in the other of the two control positions. In this case the first pusher control element can be movable in certain embodiments in the second movement direction under the effect of the spring pre-loading from the one of the control positions via the other control position into a further control position, where the plurality of path sections further comprises a third path section, which in the further control position has the same effect on the pusher as the path section effective in the one of the control positions.

In other embodiments, the at least one pusher control element further comprises a second pusher control element formed separately from the first pusher control element, which upon closing of the door by the locking clip is pushed from the one to the other of the closing positions against the effect of spring pre-loading.

According to certain embodiments, the door lock comprises a lock housing with a hook insertion opening and a blocking slider that is guided movably in the lock housing, which slider is pushed, upon closing of the door, from a release position, in which it permits insertion of a closing hook into the hook insertion opening, by the closing hook against the effect of spring pre-loading into a blocking position, in which it impedes a removal of the closing hook from the hook insertion opening. In such embodiments the at least one pusher control element comprises a first pusher control element, which forms a part of the blocking slider or is arranged for joint movement with the blocking slider.

The at least one pusher control element can further comprise a second pusher control element formed separately from the first pusher control element, which second element is pushed upon closing of the door by the closing hook from the one to the other of the control positions against the effect of spring pre-loading.

The invention further provides a household electrical appliance, for example a washing machine or a cooker, where the household appliance comprises an appliance main body with a treatment space accessible through an access opening for the treatment of objects, a door for closing the access opening and a door lock of the type explained here. The door switch, the pusher and the at least one pusher control element are arranged on the appliance main body of the household appliance in certain embodiments.

The invention is explained further below with reference to the enclosed drawings.

BRIEF DESCRIPTION OF THE DRAWINGS

FIG. 1 shows components of a door lock according to a first practical example.

FIG. 2 shows components of a door lock according to a second practical example.

FIGS. 3a to 3d show components of a door lock according to a third practical example.

FIGS. 4a, 4b and 4c show three variants of a door lock in which the invention can be used.

FIGS. 5a and 5b show a practical example of a door lock similar to the practical example in FIG. 1, but with components additionally drawn in for varying the length of a pusher of the door lock.

FIGS. 6a and 6b show components of a door lock according to a fourth practical example.

DETAILED DESCRIPTION OF THE INVENTION

Figure 7:
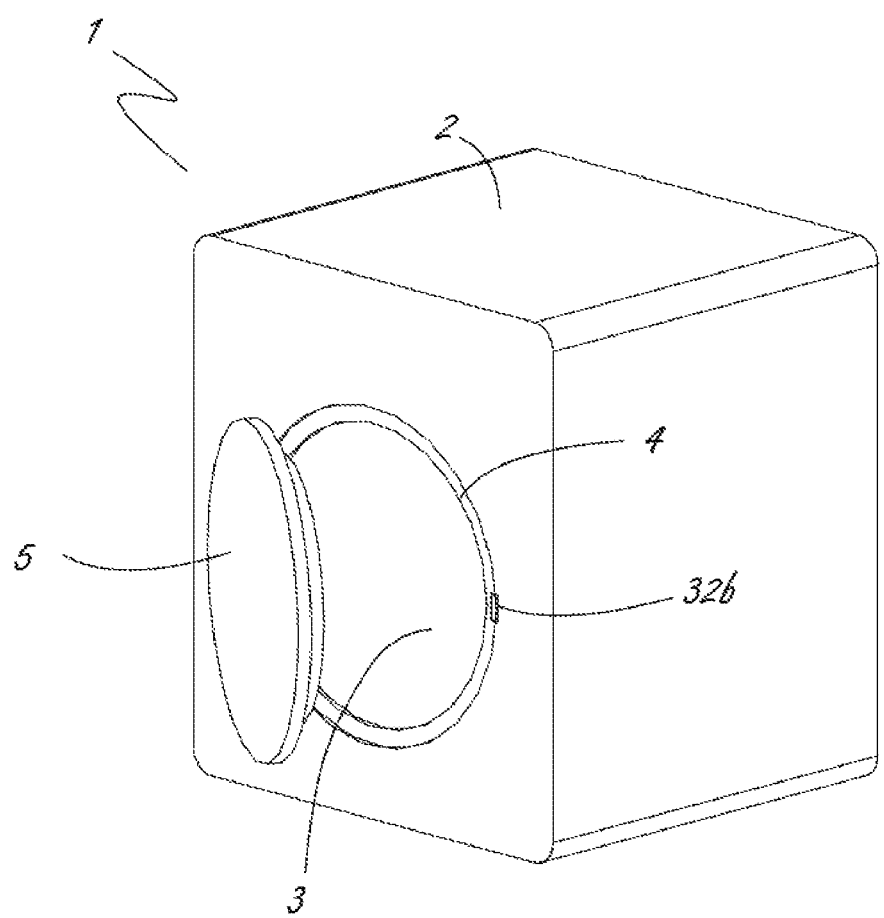
FIG. 7 is a perspective view of an appliance showing an illustration of the door lock of the present invention and its approximate location relative to the door and the appliance main body.

For all drawings it is the case that the illustrations there are of a schematic nature and do not reproduce the proportions in a real embodiment. In this respect it is neither intended nor possible to draw conclusions from the drawings as to real sizes and proportions. The drawings are only intended to illustrate structural and functional principles of the invention.

Reference is made first to FIG. 1 and the first practical example shown there. In the first practical example, a pusher 10 is used to adjust an electric door switch 12 between an open switching state and a closed switching state. The door switch 12 has two electric contact elements 14, 16, of which in the example shown the contact element 14 is formed by a metal strip acting as a leaf spring and the contact element 16 is formed by a pin, which can be formed from a piece of wire, for example. The contact element 16 extends with its pin longitudinal direction transversely to the strip longitudinal direction of the contact element 14. The door switch 12 can be part of an electric circuit, as is shown in FIG. 8 of WO 2006/063684 A1 (also granted in national stage in the U.S. as U.S. Pat. No. 8,991,877) and explained in the text of this WO document (and equivalent U.S. Patent document which is hereby incorporated by reference in its entirety). In particular, the door switch 12 can realize the switch designated '10' in FIG. 8 of WO 2006/063684 A1 (U.S. Pat. No. 8,991,877).

The situation shown in FIG. 1 represents the open switching state of the door switch 12. In this state, the contact element 14—pre-loaded in contact with the contact element 16—is lifted out of contact with the contact element 16 by the pusher 10. For example, the metal strip 14 forming the contact element 14 is fixedly clamped in the area of one strip end, while the pusher 10 acts on the other, free strip end. The pusher 10 can be arranged optionally before or after the contact element 16 as seen from the clamped end of the metal strip.

As long as the door (not shown in greater detail in the figures) of a household electrical appliance, e.g. washing machine or electric cooker, in which the first practical example according to FIG. 1 is installed, is open, the situation according to FIG. 1 exists. Closing the door causes a pusher control element 18, on which the pusher 10 is supported in the situation according to FIG. 1, to be displaced in a linear movement direction, for example, relative to the pusher 10 as indicated by a direction arrow 20. The pusher control element 18 forms a control path, which is used for positional control of the pusher 10 in the manner of a cam/cam follower mechanism. The control path is composed of several consecutive path sections in the movement direction 20 of the pusher control element 18. In the first practical example according to FIG. 1, the control path of the pusher control element 18 is composed of three such path sections in all, which are designated 22, 24 and 26. The path sections 22, 24 form an upper and a lower plateau, which lie at different heights. The path section 26 is formed as a ramp section, which runs obliquely to the movement direction 20 and connects the two plateaus 22, 24 to one another. If the upper plateau 22 is located below the pusher 10 (as shown in FIG. 1), this corresponds to a first control position of the pusher control element 18. In this first control position, the pusher 10 is blocked by the upper plateau 22 against displacement from the position in which it lifts the contact element 14 out of contact with the contact element 16 (corresponding to a first pusher position).

If the pusher control element 18 is displaced in the movement direction 20 relative to the pusher 10 (in response to closing of the door of the household appliance), first the ramp section 26 and then the lower plateau 24 moves under the pusher 10. The pusher 10 can slide down on the ramp section 26 in this case until it is finally located above the lower plateau 24. During this movement of the pusher 10, the pressure on the metal strip forming the contact element 14 is gradually reduced, until the metal strip finally comes into contact with the pin forming the contact element 16 and the door switch 12 changes its switching state from open to closed. The situation in which the lower plateau 24 is arranged under the pusher 10 corresponds to a second control position of the pusher control element 18 and a second pusher position of the pusher 10. The second control position of the pusher control element 18 is accordingly characterized in that the pusher 10 has space available for a movement into the second pusher position. The pusher 10 is guided movably by guide surfaces, which are not shown in greater detail, in a movement direction relative to the pusher control element 18 that is indicated by a double arrow 28. The movement direction 28 runs, for example, perpendicularly to the movement direction 20.

If the door of the household appliance is later opened again, the reverse process takes place. On opening of the door, the pusher control element 18 is displaced in the opposite direction relative to the pusher 10. The pusher 10 slides up the ramp section 26 in this case until it reaches the upper plateau 22. While it is sliding up the ramp section 26, the pusher 10 comes into engagement with the metal strip 14 and presses this away from the pin 16 of the door switch 12, so that the switching state of the door switch 12 changes from closed to open.

It should be pointed out that the ramp section 26 can be omitted for the transfer of the pusher 10 from the first pusher position (according to FIG. 1) to the second pusher position; it would suffice for this transfer if the lower plateau 24 and the upper plateau 22 are separated by a clear step. However, to lift the pusher 10 to the level of the upper plateau 22 in the reverse process, the ramp section 26 can be necessary.

In the other figures, identical components or components that have the same effect are provided with the same reference signs as in FIG. 1. Unless otherwise shown below, reference is made to the above statements regarding FIG. 1 to explain such components.

In the second practical example according to FIG. 2, a pusher 10a is provided, which is used to actuate a door switch that is not shown in greater detail and which is controlled not by a single pusher control element but by two pusher control elements that can be moved independently of one another. The two pusher control elements are designated 18a-1 and 18a-2 and are displaceable in the same movement direction parallel to one another relative to the pusher 10a respectively between a first control position (shown in FIG. 2) and a second control position. Each of the two pusher control elements 18a-1, 18a-2, has a control path with an upper plateau 22a, a lower plateau 24a and a ramp section 26a connecting the two plateaus. In the first control position, the two pusher control elements 18a-1, 18a-2 are located respectively with their upper plateau 22a under the pusher 10a, so that in this control position they block the pusher 10a against descending. In the second control position, the pusher control elements 18a-1, 18a-2 are located respectively with their lower plateau 24a under the pusher 10a; in this situation space is available for the pusher 10a to descend.

In the example shown in FIG. 2, the two pusher control elements 18a-1, 18a-2 are displaceable in opposite directions to one another, i.e. while one of the two pusher control elements (here the pusher control element 18a-1) is displaceable in arrow direction 20a from the first control position, the other pusher control element (here the pusher control element 18a-2) is displaceable in the opposite direction from the first control position to the second control position, as indicated in FIG. 2 by a direction arrow 30a. Embodiments are naturally also conceivable in which both pusher control elements 18a-1, 18a-2 are displaceable in the same direction from the first to the second control position and vice versa.

The door switch actuated by the pusher 10a is not drawn in in FIG. 2. It can have the same configuration, for example, as in the first practical example according to FIG. 1.

Each of the pusher control elements 18a-1, 18a-2 can be under spring pre-loading that pre-loads the relevant pusher control element 18a-1 or 18a-2. The spring pre-loading can be produced by a suitable spring element, for example a coil spring (not shown in greater detail in FIG. 2) and can pre-load the relevant pusher control element 18a-1 or 18a-2 either in the first control position or in the second control position.

The two pusher control elements 18a-1, 18a-2 can be actuated by different components of the door lock. If the door lock is constructed, for example, in such a way that upon closing of the door, a closing element arranged on the door of the household appliance comes into engagement with a component arranged on the main appliance body of the household appliance, it is conceivable that the closing element on the door side actuates one of the two pusher control elements 18*a*-1, 18*a*-2, while the component arranged on the main appliance body actuates the other pusher control element. Alternatively, it is conceivable that the closing element on the door side actuates both pusher control elements 18*a*-1, 18*a*-2.

Reference is now made to the third practical example according to FIGS. 3*a* to 3*d*. The door lock shown there is generally designated 32*b*. This door lock 32*b* comprises a closing element 34*b* with a locking clip 36*b* arranged, for example, on the door of the household appliance. Furthermore, the door lock 32*b* comprises a lock assembly arranged on the main appliance body of the household appliance with a gripper unit 38*b*, which is supported rotatably about an axis of rotation 40*b*.

As the schematic representation in FIG. 3*b* shows, the gripper unit 38*b* has a gripper opening 42*b* which is delimited by two opposing gripper jaws 44*b*, 46*b*. When the door is closed, the locking clip 36*b* dips into the gripper opening 42*b*, pushing against one of the gripper jaws 44*b*, 46*b* and thereby causing the gripper unit 38*b* to rotate about the axis of rotation 40*b*. This rotation transfers the gripper unit 38*b* from an open turning position to a closed turning position, in which the locking clip 36*b* is caught by the gripper unit 38*b*.

In certain embodiments, the rotation of the gripper unit 38*b* into the closed turning position can be completed by a translatory movement of the gripper unit 38*b* deeper into the main appliance body. Since the locking clip 36*b* is already caught in the closing opening 42*b* upon this translatory movement, it is carried along by the gripper unit 38*b*. A door lock of this kind with a tightening function permits a tight closure of the door. The force necessary for the translatory movement of the gripper unit 38*b* can be provided by a spring arrangement (not shown in greater detail), which can expand above a defined angle of rotation of the gripper unit 38*b*. For further details relating to the tightening function on a door lock with a rotatably supported gripper unit, reference is made, for example, to DE 198 37 248 A1 and DE 10 2010 051 518 A1.

The door lock 32*b* further comprises a door switch 12*b* with electric contact elements 14*b*, 16*b*, wherein the door switch is actuated by a pusher 10*b* controlled by a pusher control element 18*b*. The configuration of the door switch 12*b* corresponds to the first practical example according to FIG. 1, for example. The pusher control element 18*b* has a control path, which has a larger number of path sections than the control path of the pusher control element 18 in the first practical example according to FIG. 1. The control path of the pusher control element 18*b* is specifically composed of a first upper plateau 22*b*, a lower plateau 24*b*, a second upper plateau 48*b* and ramp sections 26*b*, 50*b*. The different path sections follow one another in the movement direction of the pusher control element 18*b* in the following order: first upper plateau 22*b*, ramp section 26*b*, lower plateau 24*b*, ramp section 50*b*, second upper plateau 48*b*. The first upper plateau 22*b* and the second upper plateau 48*b* lie at the same level, for example, and have the same effect on the pusher 10*b*, namely blocking of the pusher 10*b* from descending from the first pusher position. The ramp section 50*b* connects the lower plateau 24*b* to the second upper plateau 48*b*.

FIG. 3*a* represents the situation when the door is open. The gripper unit 38*b* is in its open turning position, in which the closing opening 42*b* is facing the locking clip 36*b*, but the locking clip 36*b* has not yet entered the closing opening 42*b*. The pusher control element 18*b* is pre-loaded by a pre-loading spring 52*b* in the direction of the gripper unit 38*b* and is supported by a first locating face 54*b* on a side face 56*b* of the gripper unit 38*b*. This situation corresponds to a first control position of the pusher control element 18*b*. The first upper plateau 22*b* is located under the pusher 10*b* in this situation, so that the door switch 12*b* is in its open state.

On closing of the door, the situation shown in FIG. 3*c* occurs. The gripper unit 38*b* has moved in this situation into its closed turning position; the locking clip 36*b* is caught in the gripper opening 42*b*. As a result of the rotation of the gripper unit 38*b*, the side face 56*b* has moved past the locating face 54*b* and made it possible for the pusher control element 18*b* to slide forward in the direction of the arrow 20*b* under the influence of the pre-loading spring 52*b*. This sliding forward of the pusher control element 18*b* proceeds to the extent that a second locating face 58*b* formed on the pusher control element 18*b* rests on the closing element 34*b*. In this situation the lower plateau 24*b* is located under the pusher 10*b*, i.e. the door switch 12*b* is in its closed switching state. The pusher control element 18*b* is located in a second control position. If the door is then opened again, the pusher control element 18*b* returns from its second control position according to FIG. 3*c* to the first control position according to FIG. 3*a*. In this case the door switch 12*b* is transferred back to its open switching state by the pusher 10*b* sliding up the ramp section 26*b* to the first upper plateau 22*b*.

It cannot be excluded that the gripper unit 38*b* is manipulated unintentionally, for example by a child playing, in such a way that it is moved from its open turning position to the closed turning position without the door being closed at the same time. In order to prevent permanent closing of the door switch 12*b* in case of such an error, the pusher control element 18*b* can be moved under the influence of the pre-loading spring 52*b* from the first control position via the second control position to a third control position, which is shown in FIG. 3*d*. In this third control position, the pusher control element 18*b* is displaced so far relative to the pusher 10*b* that the second upper plateau 48*b* is located under the pusher 10*b*. On account of the identical or substantially identical level of the second upper plateau 48*b* to the first upper plateau 22*b*, the door switch 12*b* is opened in this state. In the case of an error (i.e. turning of the gripper unit 38*b* into the closed turning position without closing of the door), the pusher control element 18*b* moves accordingly from the first control position according to FIG. 3*a* to the third control position according to FIG. 3*d*, wherein the ramp section 26*b*, the lower plateau 24*b* and the ramp section 50*b* pass successively under the pusher 10*b* before the second upper plateau 48*b* arrives under the pusher 10*b*. In the third control position, the pusher control element 18*b* rests with its first locating face 54*b* against a housing part 60*b* of the door lock 32*b*, for example, that is schematically indicated in FIG. 3*d*.

Reference is now made to the exemplary structural variants of a door lock according to FIGS. 4*a*, 4*b* and 4*c*.

The variant according to FIG. 4*a* comprises a gripper unit 38*c*, which is supported rotatably in a rotation plane indicated by a dashed line 62*c* between an open turning position and a closed turning position and—similar to the gripper unit 38*b* of the third practical example according to FIGS. 3*a* to 3*d*—grips and holds a locking clip of a closing element (for example, the locking clip 36*b*) on closing of the door. The door lock 32*c* further comprises a blocking slider 64*c*, which is guided in a linearly movable manner in a normal (i.e. perpendicular) direction relative to the rotation plane 62*c*, as indicated by a double arrow 66*c*. If the door is pulled to open it, a force is transmitted to the gripper unit 38*c* that tries to move the gripper unit 38c along the rotation plane 62 in a rotatory and/or translatory manner (indicated schematically by an arrow 68c). A wedge engagement between the gripper unit 38c and the blocking slider 64c leads to the gripper unit 38c being able to push the blocking slider 64c to the side (to the left in FIG. 1) and so the door can be opened.

Locking of the closed door is possible in that a bolt element 70c, which is guided movably in a linear manner, for example, between an unlocked position and a locked position (indicated by a double arrow 72c), is moved into engagement with the blocking slider 64c in the closed state of the door in such a way that this cannot move back if the door is pulled. This situation is shown in FIG. 4a. A force acting on the gripper unit 38c as a result of an attempt to open the door is then split into two components due to the wedge engagement between gripper unit 38c and blocking slider 64c. A first component acts in the movement direction of the blocking slider 64c (i.e. along the double arrow 66c) and is diverted to the bolt element 70c. Another force component acts parallel to the rotation plane 62c and is diverted by the blocking slider 64c directly into a housing part of the door lock 32c indicated by 74c. As a result of the force splitting, the force acting on the bolt element 70c is accordingly not the full force that acts on the gripper unit 38c in case of an attempt to open the door. Instead only a portion of this force is diverted to the bolt element 70c.

In the variant according to FIG. 4b, an additional intermediate slider 76d is provided, which is guided displaceably along the rotation plane 62d, as indicated by a double arrow 78d. In contrast to the variant according to FIG. 4a, a wedge engagement exists between the blocking slider 64d and the intermediate slider 76d in the variant according to FIG. 4b. A direct engagement between the blocking slider 64d and the gripper unit 38d does not exist. On the contrary, the gripper unit 38d is in engagement with the intermediate slider 76d, but in a form that produces no resulting force diagonally or perpendicularly to the rotation plane 62d. In the simplest case, the engagement between the gripper unit 38d and the intermediate slider 76d is formed as a blunt joint. If the door is pulled when it is closed and locked, this leads to a diversion of force from the gripper unit 38d via the intermediate slider 76d to the blocking slider 64d and from there—on account of the wedge engagement between blocking slider 64d and intermediate slider 76d—partly to the bolt element 70d and partly directly onto the housing part 74d.

In the variant according to FIG. 4c, only the blocking slider 64e is located in the force transmission path between the gripper unit 38e and the bolt element 70e. Although an additional slider such as the intermediate slider 76d according to FIG. 4b, for instance, is not ruled out in principle, it is not necessary. The engagement between the gripper unit 38e and the blocking slider 64e is executed so that, on pulling of the door, a resulting force acts upon the blocking slider 64e parallel to the rotation plane 62e. For example, the blocking slider 64e can have a flat engagement face 80e lying orthogonal to the rotation plane 62e for this purpose, which face lies bluntly opposite a likewise flat engagement face 82e of the gripper unit 38e.

In contrast to the variants according to FIG. 4a and FIG. 4b, the blocking slider 64e in the variant according to FIG. 4c is guided movably in a direction obliquely to the rotation plane 62e on the housing part 74e. The diagonal position angle can be expressed with reference to a normal to the rotation plane 62e and is designated $\alpha$ in FIG. 4c. It can be between roughly 30 degrees and roughly 40 degrees, for example.

If an attempt is made to open the door when it is closed but not locked, the gripper unit 38e can push the blocking slider 64e away on account of its diagonal guidance on the housing part 74e and the door can thus be opened. If on the other hand the blocking slider 64e is blocked by the bolt element 70e, this does not work. The force introduced by the gripper unit 38e into the blocking slider 64e is then split into two force components as a result of the diagonal guidance on the housing part 74e. One of these force components is diverted by the blocking slider 64e directly into the housing part 74e, the other force component is transmitted to the bolt element 70e.

Each of the blocking sliders 64c, 64d, 64e of the variants according to FIGS. 4a to 4c can form a pusher control element as explained in the scope of the first, second and third practical example or be coupled to such a pusher control element for simultaneous movement.

Reference is now made to FIGS. 5a and 5b complementary to FIG. 1. These figures illustrate by way of example with reference to the first practical example how, in the second control position of the pusher control element 18 (i.e. when the lower plateau 24 is located under the pusher 10) an effective length of the pusher 10 can be varied in order to guarantee increased security against an unintentional opening of the door switch 12, which is closed in this situation. The pusher 10 is constructed in several parts to this end and in the specific example in two parts. It comprises a base part 84 for engagement with the control path of the pusher control element 18 and a pusher part 86 for engagement with the metal strip forming the contact element 14. The pusher part 86 is coupled to the base part 84 and is variable relative to this in its height position, so that the overall height of the pusher 10 is variable. For example, the pusher part 86 is rotatable relative to the base part 84 about an axis of rotation 87 running along the movement direction 28, where on the base part 84 and/or on the pusher part 86 one or more control faces (not shown) rising in the manner of a ramp can be formed in a circumferential direction, which upon rotation of the pusher part 86, depending on the relative rotation direction, cause a raising or lowering of the pusher part 86 in relation to the base part 84.

When the door is open and also when the door is closed but unlocked, the pusher part 86 is located in a raised position relative to the base part; the pusher 10 has a first effective length, seen in the movement direction 28 of the pusher 10. When the door is closed and locked, on the other hand, the pusher part 86 is in a lowered position relative to the base part 84. The pusher 10 then has a second effective length, which is shorter than the first effective length. FIGS. 1 and 5a show the state in which the pusher 10 has the first effective length, while FIG. 5b shows the state in which the pusher 10 has the second effective length.

In the second pusher position of the pusher 10 (i.e. when the pusher control element 18 is located in its second control position and the lower plateau 24 lies accordingly under the pusher 10), a gap $d_1$ exists between the pusher 10 and the metal strip 14 (or between the pusher 10 and the lower plateau 24, if the door lock is placed on the head) as long as the door of the household appliance is closed but not yet locked. On locking of the closed door (corresponding to a blocking of the blocking slider 64e by the bolt element 70e in the variant according to FIG. 4c, for example), the pusher 10 is shortened from its first effective length to its second effective length. The gap between the pusher 10 and the metal strip 14 (or between the pusher 10 and the lower plateau 24) is increased by this to a value $d_2$. The value of $d_1$ can lie in a range from roughly 0.5 mm to roughly 2 mm, for example. The increase in the gap between pusher 10 and metal strip 14 (or between pusher 10 and lower plateau 24) achieved by lowering of the pusher part 86 relative to the base part 84 can be a few tenths of a millimetre, for example, so that the value of $d_2$ is greater by this difference than the value of $d_1$.

To shorten the length of the pusher 10, the base part 84 or the pusher part 86 can optionally have an adjustable mechanical connection, for example, to an electromagnetic actuator 88 (FIG. 5a). This actuator 88 has an adjustable mechanical connection at the same time to a bolt element, which is adjustable between an unlocked position and a locked position and locks the closed door in the locked position. The bolt element can correspond, for example, to the variants: bolt element 70c (as shown in FIG. 4a), bolt element 70d (as shown in FIG. 4b), and bolt element 70e (as shown in FIG. 4c). Regardless of which variant is employed, actuation of the bolt element 70c, 70d, 70e by the actuator 88 causes a rotation of the base or pusher part 84 or 86 at the same time, so that the pusher part 86 transfers to its lowered position relative to the base part 84 when the bolt element 70c, 70d, 70e is transferred to its locked position and vice versa.

The increased clearance between pusher 10 and metal strip 14 when the door is closed and locked offers greater security that the door switch 12 does not open accidentally in spite of any pulling movements of the pusher control element 18. Such pulling movements of the pusher control element 18 can derive from the attempt to open the locked door forcibly.

Reference is now made to the fourth practical example according to FIGS. 6a and 6b. The door lock 32f shown there comprises a lock housing 92f, which has a hook insertion opening 94f for a door hook 98f fitted pivotably about a pivot axis 96f on the door of the household appliance. In the illustration in FIGS. 6a, 6b, the pivot axis 96f runs perpendicularly to the sheet plane. On the hook insertion opening 94f an insertion bevel 100f is formed, which the closing hook 98f encounters on closing of the door. The insertion bevel 100f causes pivoting of the closing hook 98f against the effect of a pre-loading spring, which is not shown in greater detail, so that the closing hook 98f can pass through the hook insertion opening 94f. As soon as the closing hook 98f has passed the hook insertion opening 94f, it pivots back under the effect of its pre-loading spring in the direction of its resting position according to FIG. 6a. In doing so, it pushes a blocking slider 104f guided movably in the lock housing 92f in a linear sliding direction (indicated by a double arrow 102f) out of a first slider position into a second slider position. The first slider position is shown in FIG. 6a; the blocking slider 104f is pre-loaded in this first slider position by a pre-loading spring 106f. The second slider position is shown in FIG. 6b; in this second slider position the blocking slider 104f is displaced so far along the sliding direction 102f that a bolt element 108f can engage in an engagement formation 110f of the blocking slider 104f, which formation is formed in the example shown as a hole. Due to the engagement of the bolt element 108f with the engagement formation 110f, the blocking slider 104f can be blocked in its second slider position. Opening of the door is not possible in this state. The closing hook 98f enters a recess 112f of the blocking slider 104f on closing of the door and pushes against a front limiting edge 114f of the recess 112f. A rear limiting edge 116f of the recess 112f prevents pivoting of the closing hook 98f and thus opening of the door when the door is locked.

The blocking slider 104f forms a pusher control element 18f or is coupled with such an element for joint movement. The pusher control element 18f in the fourth practical example controls a pusher 10f, which assumes its first pusher position when the door is closed and its second pusher position when the door is open. This is because when the door is open, the pusher 10f is out of contact with the metal strip 14f of the door switch 12f, while it presses the metal strip 14f into contact with the pin 16f of the door switch 12f when the door is closed. When the door is open, the pusher control element 18f is located with its lower plateau 24f under the pusher 10f (see FIG. 6a) and when the door is closed, it is moved with its upper plateau 22f under the pusher 10f (see FIG. 6b). In this case the pusher 10f slides up the ramp section 26f onto the upper plateau 22f. The pusher control element 18f in the fourth practical example accordingly experiences a movement on closing of the door from the second control position (space is available for a movement of the pusher 10f) to the first control position (pusher 10f is blocked against movement to the second pusher position). For this mode of operation the metal strip 14f and the pin 16f of the door switch 12f in the fourth practical example are out of contact in the absence of any external influence and can only be brought into mutual contact by the influence of the pusher 10f. Alternatively a configuration according to the first practical example in FIG. 1 can be selected for the door switch 12f and the pusher control element 18f.

According to a modification of the fourth practical example, another pusher control element (not shown in greater detail) can be provided in addition to the pusher control element 18f, which other control element controls the pusher 10f in the manner of the second practical example according to FIG. 2 together with the pusher control element 18f and is actuatable, for example, likewise by the closing hook 98f. An additional pusher control element of this kind can offer security against an unintended closing of the door switch 12f, if a child playing pushes the blocking slider 104f from the first to the second slider position without closing the door, for example.

Turning now to FIG. 7, there is illustrated one example of an appliance with the door lock with door switch 12 of the present invention. An appliance 1 has an appliance main body 2 with a treatment space 3 disposed within appliance main body 2. Treatment space 3 is accessible through an access opening 4 by opening a door 5. A door lock 32b with door switch 12 is configured to operate upon closing and/or opening of door 5. The door lock 32b with the door lock switch 12 is arranged in the illustrated embodiment on the appliance main body 2.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A door lock for a door of a household electrical appliance, the door being capable of opening and closing, the door lock comprising:
    an electric switch for detecting the opening and closing of the door of the household appliance, the electric switch including two contact elements, wherein upon closing of the door of the household appliance, the electric switch transforms from a first electrical switching state to a second electrical switching state, wherein the first electrical switching state has the two contact elements out of electrical contact with each other and the second electrical switching state has the two contact elements in electrical contact with each other;

a pusher, which is displaceable in a first movement direction from a first pusher position to a second pusher position, wherein the pusher presses against a first of the two contact elements in the first pusher position and by this holds the electric switch in one of the first electrical switching state or the second electrical switching state, wherein, by displacement of the pusher from the first pusher position to the second pusher position, a transfer of the electric switch can be brought about to the other of the first electrical switching state and the second electrical switching state; and at least one pusher control element, which is movable relative to the pusher in a second movement direction running transversely to the first movement direction at least between a first control position and a second control position and which on closing of the door moves from one of the first control position or the second control position to the other;

wherein the pusher control element includes a control path having a plurality of path sections following one another along the second movement direction, wherein the plurality of path sections comprises a first path section, which in the first control position blocks the pusher against displacement into the second pusher position, wherein the plurality of path sections further comprises a second path section, which in the second control position provides the pusher with space for a displacement to the second pusher position.

2. The door lock according to claim 1, wherein the electric switch is part of an electric circuit for detecting the opening and closing of the door of the household appliance, and wherein the first electrical switching state of the electric switch is an electrically open switching state and the second electrical switching state is an electrically closed switching state.

3. The door lock according to claim 2, wherein the two contact elements are pre-loaded by spring force in reciprocal contact and the pusher lifts one of the two contact elements out of contact with the other of the two contact elements in its first pusher position, wherein a locking mechanism having an unlocked state and a locked state, which in the unlocked state permits opening of the door when the door is closed and in the locked state locks the closed door against opening, wherein an effective length of the pusher measured along the first movement direction is variable as a function of a transfer of the locking mechanism from the unlocked state to the locked state, wherein on transfer of the locking mechanism from the unlocked state to the locked state, a gap between the pusher and one of the contact elements increases.

4. The door lock according to claim 1, wherein the two contact elements are pre-loaded by spring force in reciprocal contact and the pusher lifts one of the two contact elements out of contact with the other of the two contact elements in its first pusher position.

5. The door lock according to claim 4, wherein one of the two contact elements is formed by a leaf spring.

6. The door lock according to claim 4, wherein the other of the two contact elements is formed by a pin.

7. The door lock according to claim 1, wherein the pusher in its first pusher position presses one of the two contact elements into contact with the other of the two contact elements.

8. The door lock according to claim 1, wherein the control path between consecutive path sections runs obliquely to a plane orthogonal to the first movement direction.

9. The door lock according to claim 1, comprising a locking mechanism having an unlocked state and a locked state, which in the unlocked state permits opening of the door when the door is closed and in the locked state locks the closed door against opening, wherein an effective length of the pusher measured along the first movement direction is variable as a function of a transfer of the locking mechanism from the unlocked state to the locked state.

10. The door lock according to claim 9, wherein the pusher has a base part for engagement with the pusher control element and a pusher part, which sits on the base part and is movable in relation to this in the first movement direction between a raised position and a lowered position for engagement with a first of the two contact elements, wherein on transfer of the locking mechanism from the unlocked state to the locked state, the pusher part moves from the raised position to the lowered position or vice versa.

11. The door lock according to claim 9, wherein the locking mechanism comprises an electromagnetic actuator, which is in actuation engagement with the pusher, in order to adjust the pusher part between a greater and a smaller effective length.

12. The door lock according to claim 10, wherein the pusher part is arranged relative to the base part rotatably about a first axis of rotation running in the first movement direction and at least one run-up surface running in the form of a ramp obliquely to a plane orthogonal to the first movement direction is effective between the pusher part and the base part.

13. The door lock according to claim 1, wherein the pusher control element is located in the first control position when the door is open.

14. The door lock according to claim 1, wherein the at least one pusher control element comprises two pusher control elements movable independently of one another, which are both located in the same control position when the door is open.

15. The door lock according to claim 1, further comprising:
a lock housing; and
a gripper unit taken up in the lock housing about a second axis of rotation, which unit rotates on closing of the door of the household appliance from an open turning position to a closed turning position, wherein the gripper unit grips a locking clip in the closed turning position to hold the door closed and releases the locking clip to open the door in the open turning position,
wherein the at least one pusher control element comprises a first pusher control element, which is supported in the open turning position of the gripper unit under spring pre-loading on the gripper unit and upon rotation of the gripper unit from the open turning position to the closed turning position, executes a movement from the one to the other of the first control position and the second control position under the effect of the spring pre-loading.

16. The door lock according to claim 15, wherein the at least one pusher control element further comprises a second pusher control element formed separately from the first pusher control element, which second pusher control element is pushed on closing of the door by the locking clip from the one to the other of the first closing position and the second closing position against the effect of spring pre-loading.

17. The door lock according to claim 15, wherein the first pusher control element can be moved back from the other to the one of the first control position and the second control position against the effect of the spring pre-loading by engagement with the gripper unit.

18. The door lock according to claim 15, wherein the first pusher control element is supported in the other of the first control position and the second control position on the locking clip.

19. The door lock according to claim 18, wherein the first pusher control element is movable in the second movement direction under the effect of the spring pre-loading from the one of the first control position and the second control position via the other of the first control position and the second control position to a further control position, wherein the plurality of path sections further comprises a third path section, which in the further control position has the same effect on the pusher as the path section effective in the one of the first control position and the second control position.

20. The door lock according to claim 1, further comprising:
   a lock housing with a hook insertion opening; and
   a blocking slider, which is guided movably in the lock housing and is pushed on closing of the door from a release position, in which it permits an insertion of a closing hook into the hook insertion opening, by the closing hook against the effect of spring pre-loading into a blocking position, in which it impedes the closing hook from being pulled out of the hook insertion opening,
   wherein the at least one pusher control element comprises a first pusher control element, which forms a part of the blocking slider or is arranged for joint movement with the blocking slider.

21. The door lock according to claim 20, wherein the at least one pusher control element further comprises a second pusher control element formed separately from the first pusher control element, which second pusher control element is pushed on closing of the door by the closing hook against the effect of spring pre-loading from the one to the other of the first control position and the second control position.

22. A household electrical appliance, comprising;
   an appliance main body with a treatment space accessible by an access opening for treatment of objects,
   a door for closing the access opening, and
   a door lock that interacts with the door, the door lock comprising:
   an electric switch being part of an electric circuit for detecting the opening and closing of the door of the household appliance, the electric switch including two contact elements, wherein upon closing of the door of the household appliance, the electric switch transforms from a first electrical switching state to a second electrical switching state, wherein one of the first and second electrical switching states has the two contact elements in electrical contact with each other, and wherein another of the first and second electrical switching states has the two contact elements out of electrical contact with each other;
   a pusher, which is displaceable in a first movement direction from a first pusher position to a second pusher position, wherein the pusher presses against a first of the two contact elements in the first pusher position and by this holds the electric switch in one of the first electrical switching state or the second electrical switching state, wherein, by displacement of the pusher from the first pusher position to the second pusher position, a transfer of the electric switch can be brought about to another of the first electrical switching state and the second electrical switching state; and
   at least one pusher control element, which is movable relative to the pusher in a second movement direction running transversely to the first movement direction at least between a first control position and a second control position and which on closing of the door moves from one of the first control position or the second control position to the other;
   wherein the pusher control element includes a control path having a plurality of path sections following one another along the second movement direction, wherein the plurality of path sections comprises a first path section, which in the first control position blocks the pusher against displacement into the second pusher position, wherein the plurality of path sections further comprises a second path section, which in the second control position provides the pusher with space for a displacement to the second pusher position.

23. The household electrical appliance according to claim 22, wherein the electric switch, the pusher and the at least one pusher control element are arranged on the appliance main body.

* * * * *